United States Patent [19]

Tiuri et al.

[11] 4,004,219
[45] Jan. 18, 1977

[54] METHOD FOR MEASURING THE CONDITIONS INSIDE A METAL COVERED FURNACE DURING ITS OPERATION

[75] Inventors: Martti Tiuri, Tapiola; Tapio Tirkkonen, Helsinki, both of Finland

[73] Assignee: Insinooritoimisto Innotec Oy, Suomenoja, Finland

[22] Filed: Feb. 21, 1975

[21] Appl. No.: 551,851

[30] Foreign Application Priority Data

Feb. 22, 1974 Finland .............................. 74521
Feb. 3, 1975 Finland ............................. 750288

[52] U.S. Cl. ............................. 324/58.5 A; 73/351; 73/362 AR
[51] Int. Cl.² ........................................ G01R 27/04
[58] Field of Search .................. 324/58.5 A, 58 A; 73/351, 362 AR

[56] References Cited

UNITED STATES PATENTS

| | | | |
|---|---|---|---|
| 3,115,131 | 12/1963 | Holliday | 324/58 A X |
| 3,452,597 | 7/1969 | Grady, Jr. | 73/351 X |
| 3,527,097 | 9/1970 | Deczky | 73/351 |

FOREIGN PATENTS OR APPLICATIONS 217,002   11/1968   U.S.S.R. ...................... 324/58.5 A

*Primary Examiner*—Stanley T. Krawczewicz

[57] ABSTRACT

An arrangement for measuring conditions within a cement kiln in which the metallic body of the kiln is used as a wave guide for radio waves used for the measurement. An antenna with radio frequency energy applied thereto, runs through the kiln, and measuring antennas are located at predetermined points along the length of the kiln. The prevailing field strength measured by the measuring antennas is indicative of the conditions, particular temperature, which prevail within the kiln. Each of the measuring antennas may lie in a plane perpendicular to the kiln access, and a stationary link is inductively coupled to each measuring antenna. The stationary link travels around the kiln in a plane perpendicular to the axis thereof.

10 Claims, 6 Drawing Figures

METHOD FOR MEASURING THE CONDITIONS INSIDE A METAL COVERED FURNACE DURING ITS OPERATION

This invention relates to a new method for measuring conditions, such as temperature, amount of material etc. inside a metal coated furnace, e.g. a cement kiln. As we know a cement kiln is generally a relatively long (100 to 200 meters) rotating kiln inside which the temperature can climb up to 2000° C in the gaseous parts of the kiln. There is plenty of dust inside the kiln on the bottom of which lies the actual mass having also relatively high temperature. Similar types of furnaces are in industrial use with several other processes.

Earlier attempts were made to measure the temperature of cement kiln and the like by using mainly resistance thermometers or pyrometric thermometers. Both of these are subject to considerable strains and problems due to the conditions inside the kiln.

The measuring of the temperature is, however, one of the basic presuppositions in order to make the regulation of the kiln possible. Considerable economic advantages are naturally obtained by proper regulation of the kiln.

Thus, the thermometer must be able to put up with the severe conditions inside the kiln as well as possible, and furthermore the transfer of the measured result to the stationary regulation parts is to be provided as simply as possible. If the device can further be used for obtaining other information on the contents of the furnace the realisation of the regulation becomes even easier.

By means of this invention there has been accomplished a completely new method for measuring the temperature and other properties inside a cement kiln having high temperatures, and the metallic body of the kiln is utilized in this method so that it serves as the wave guide for the radio waves used for the measurement. The transmitting antenna is suitably disposed, e.g. at one end of the kiln and relatively to the length of the kiln there is measured the field which provides a certain indication of the conditions in the kiln as they change. The particular features of the invention are described in the claim 1.

A typical cement kiln is a long, circular steel tube on the inner surface of which there is lining of fireproof masonry. This tube lies in a suitably inclined position, usually about 4°, and the fuel for increasing the temperature of the kiln is fed in through the lower end of the tube while the raw material is fed in through the upper end of the tube. The finished cement is removed from the kiln near the lower end. The kiln can be regulated mainly by regulating the amounts of the raw material and the fuel to be fed in the oven, and also by regulating the amount of oxygen or air required for combustion. Most of the other devices in connection with this kiln have no significance as far as the realisation of this invention is concerned which is why they are not particularly described in this specification, although they are naturally still necessary in the complete kiln.

According to the invention the radio-frequency which is used, should be such that it exceeds the minimum frequency of the wave guide constituted by the tube. Frequencies over 45 MHz have been successfully used in the tests the diameter of the kiln being 4 meters.

The supplying of the wave guide constituted by the kiln can preferably be provided through the lower end of the kiln. With the normally constructed kiln there is provided a non-rotating, stationary end plate at the lower end via which, e.g. the fuel is supplied. Through this plate the antenna or a corresponding part of it can be taken by means of which part the radio energy is supplied to the wave guide constituted by the kiln, the supplying being performed in the manners previously known in radio engineering so that the desired wave form propagates along the kiln. There is nothing special in the structure of this antenna as to the radio technique, except for the fact that it is manufactured so that it is able to put up with the conditions in the kiln as well as possible.

The kiln is remarkably long and in the tube constituted by it there occurs so much attenuation that at the other end of the kiln there occurs no disturbing reflection. Should some reflections occur, they can be eliminated by altering the structure of the other end of the kiln in a suitable way as far as the radio waves are concerned without disturbing the function of the kiln.

The wave length or phase and attenuation of the radio energy propagating in the wave guide do not only depend upon the frequency and the structure of the wave guide but also upon the amount, location and electric properties of the material in wave guide, this dependence being such that it can be calculated by methods known in wave guide technique. For example, the wave length primarily depends upon the dielectric constant and the amount of the material and the attenuation of the wave primarily depends upon the specific resistance or loss and the amount of the material. Thus, if the field of the radio wave propagating in the wave guide constituted by the kiln can be measured along the kiln, the result obtained will indicate properties of the material in the kiln.

The dielectric constant of a material, e.g. cement mass, which is contained in the kiln depends to some extent and the specific resistance depends largely upon the temperature of the material. Thus the radio energy fed in the oven also attenuates, as it propagates, according to the temperature of the mass. By measuring the field strength at the desired spots and so determining the attenuation over the various areas of the kiln, it is possible to form an opinion about the temperature conditions inside the kiln and other factors which have effect on the attenuation of the field. If the wave length or phase of the field is measured in addition to or instead of attenuation, further information on the conditions inside the kiln will be obtained.

As the effect of different factors also depends upon the radio wave frequency in various ways, further information about the conditions in the kiln can be obtained by performing measurements in several different frequencies which information may be useful for regulation.

The electric field of the radio energy propagating in the wave guide formed by the kiln and by the material in it can be measured by means of a measuring antenna i.e. a measuring sond which protrudes through the kiln shell and which does not have to extend through the protective masonry and thus it does not become directly subjected to the conditions inside the kiln.

Magnetic field can be measured instead of electric field in which case the coupling to the outer side of the kiln is performed via a slit in the metal coating. Generally other coupling methods, known in wave guide technique, can also be applied to be used with the kiln.

As described above, the transmitting antenna can be disposed at the end of the kiln which end, with the normal kiln structure, does not rotate together with the shell and thus no movable joints are required for it. On the other hand, the measuring antenna, in the case of the cement kiln, is located within the area of the rotating shell, and the information received from the antenna is to be transmitted further until it is finally received in the actual measuring equipment.

As the measurement is based on the transmission of energy by means of radio frequency, the measured quantity can be further transmitted from the antenna forward by using inductive or wireless coupling. This is carried out e.g. in such a way that, as the measuring antenna rotates with the shell, it passes at a desired spot or spots during its revolution a receiving link whereby the measuring antenna is inductively attached to this stationary measure antenna. Thus the equipment receive information simultaneously about any present position which means that the measurement is accomplished only when the antenna takes a desired position relative to the inner part of the furnace and to the mass inside.

The electronic part of the device for measuring the signal received from the stationary measuring antenna and for turning it into a quantity which indicates either attenuation or phase does not, within the frame of this invention, incorporate anything that would be new for those skilled in radio or measuring technique. Therefore it is sufficient just to point out that the signal received by the stationary measuring antenna will be in a suitable way converted into a quantity which indicates the temperature inside the kiln, and this quantity could then be further used for regulation and supervision of the furnace. As described above, some other conditions inside the kiln can also be detected by treating the measurement result. Among others these include the amount and location of the mass. For this, the measurement is preferred to be carried out with more than one frequency.

Above we have described a measuring method in which the transmitting antenna is placed at one end of the furnace. In some cases the end may, however, be constructed in such a way that the radio wave cannot suitably be supplied into the wave guide constituted by the kiln. The measuring method according to the invention can be applied so that the supplying of the radio wave is accomplished via some measuring antennas and the measuring itself is performed from other measuring antennas or from the same antenna as used for transmitting. In this case the metal body together with the lining of the kiln composes a wave guide or a surface wave guide and by measuring the field of the radio wave propagating in this wave guide information about the conditions inside the kiln is obtained in exactly the same way as when using a transmitting antenna located in the end of the furnace.

In some cases it is possible to simplify the measuring method so that only one antenna per measuring position is needed. For example the amount and position of the cement mass inside the kiln can be determined by measuring the input impedance of the antenna during the rotation of the kiln. This is possible because the coupling and hence the input impedance of the antenna to the kiln is dependent on the propagation properties of the radio energy in the wave guide and on the position of the cement mass with respect to the antenna.

The invention will now be described with reference to the accompanying drawings which illustrate the end structure of the furnace provided with the antenna and the measuring antenna attached to the rotating furnace wall from which antenna the field is measured in a certain spot and with the help of the result a quantity indicating attenuation or wave length and phase will then be obtained, which quantity, with certain dependence, corresponds to the temperature, amount of mass and other conditions inside the furnace.

Figure 1:
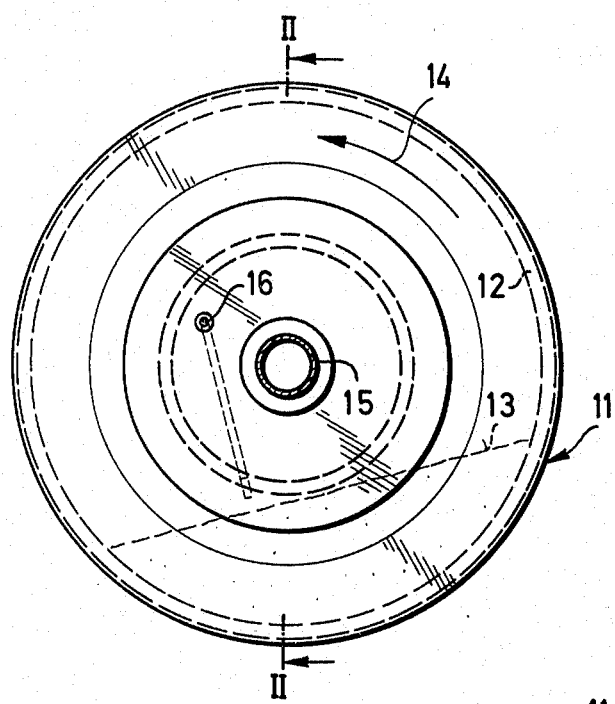
FIG. 1 is a relatively schematic end view of the cement kiln showing the location of the fuel supply tube in the middle, the dashed lines outlining the surface level of the material inside the kiln and showing the location of the transmitting antenna according to the invention.

FIG. 1 shows the cement kiln as seen from the end. This kiln comprises the shell 11 which, as mentioned above, is usually made of some conductive material, e.g. steel. Inside this shell there is the lining 12 which is meant to protect the shell from the conditions inside the furnace. The dashed lines in the figure show the amount of the semi-fabricated product 13 with its surface in somewhat diagonal position as the furnace is rotating in the direction indicated by the arrow 14. In the middle of the end mentioned above there is a tube 15 for fuel supply and this fuel may, generally speaking, be any kind of fuel, e.g. gas, oil or coal dust. The antenna 16 according to the invention is disposed at the end near the centre and it is substantially perpendicular relative to the mass 13 whereby the electric field of the radio wave in the kiln also takes a perpendicular position against the surface of the mass.

Figure 2:
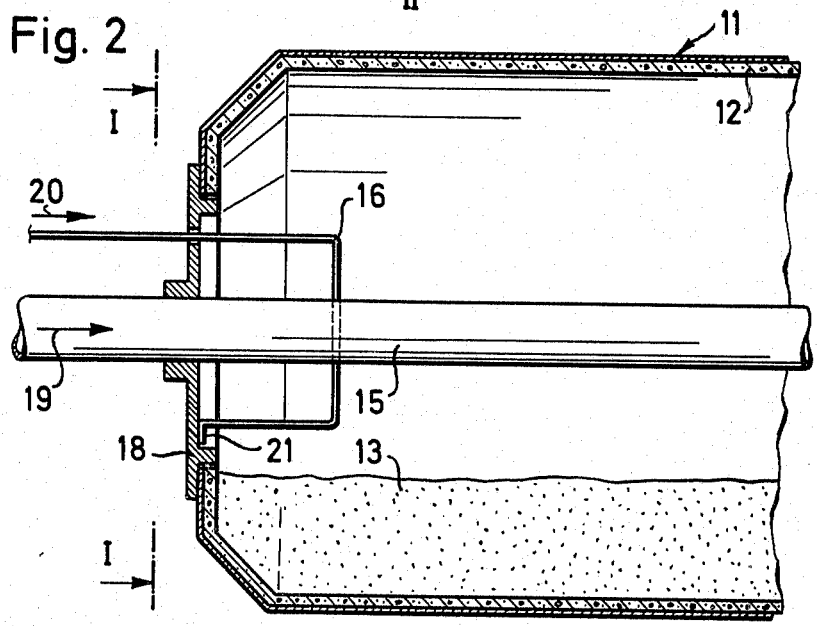
FIG. 2 is a side view of the same transmitting antenna.

FIG. 2 shows the end of the furnace as a side view to the plane which is parallel to the antenna 16. This figure also shows the lining 12 and the fuel supply tube 15 into which the fuel is fed from the outside through the stationary end 18 as the arrow 19 shows. The figure also shows one embodiment of the supplying antenna 16 to which the energy having the radio frequency is brought from a supply source (not shown) in the direction of the arrow 20.

Figure 3:
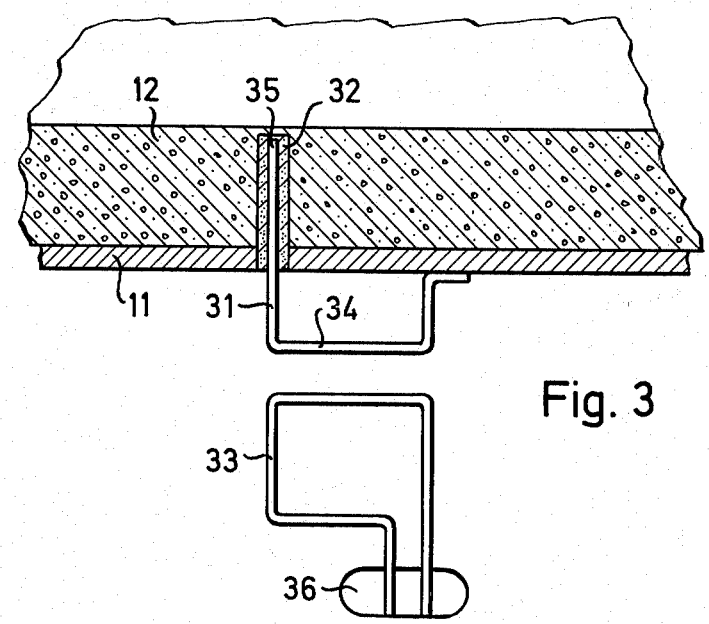
FIG. 3 is a side view of the measuring antenna placed in the rotating part of the kiln and the figure shows the steel shell of the kiln with the fire proof lining or masonry therein and it also shows the actual measuring antenna according to this invention.

FIG. 3 shows in a larger scale the measuring antenna attached to the rotating part of the kiln. This antenna extends through the furnace shell 11 and penetrates into the masonry 12 and the conductive sond-like part 35 of the antenna 31 is insulated from these by a suitable insulator 32, e.g. asbestos. The part of the antenna remaining on the outside of the kiln is then turned to run in the direction parallel to the furnace shell and after a suitable distance it is attached to the shell 11.

This distance must be chosen to be such that at the used radio frequency there is developed an appropriate coupling link. The link 33 is also arranged stationary outside the furnace so that the part 34 of the antenna running in the direction of the furnace shell once in each revolution passes the link 33 close enough. Thus the voltage of the loop 33 due to the oscillations developed in the antenna 31 which in turn are dependent on the strength and phase of the field inside the furnace at the point of the sond 35. This induced voltage is then transferred from the connection poles 36 to the electronic equipment by means of which the amplitude of oscillation is suitably measured and by using known quantities, e.g. the strength of outgoing radiation, it is converted for detecting the attenuation accomplished inside the furnace. This amount of attenuation is still very much dependent on the temperature in the furnace. If besides the amplitude of oscillations also their phase has been measured or the measuring has been carried out by using more than one frequencies, also other information than that concerning the temperature can, as mentioned above, be obtained.

Figure 4:
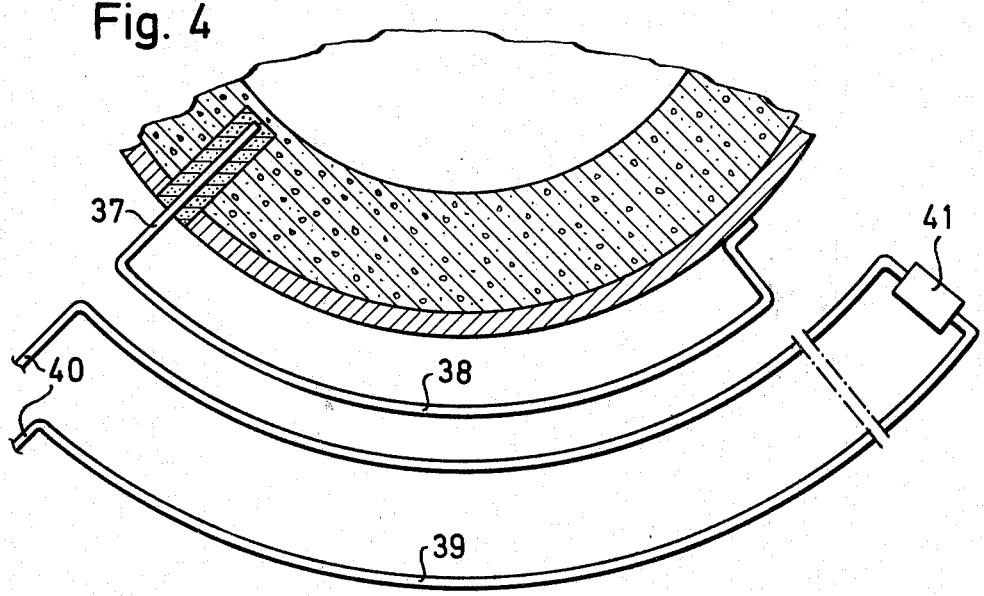
FIG. 4 shows another embodiment of the measuring antenna as seen along the plane parallel to the cross-section of the kiln.
Figure 6:
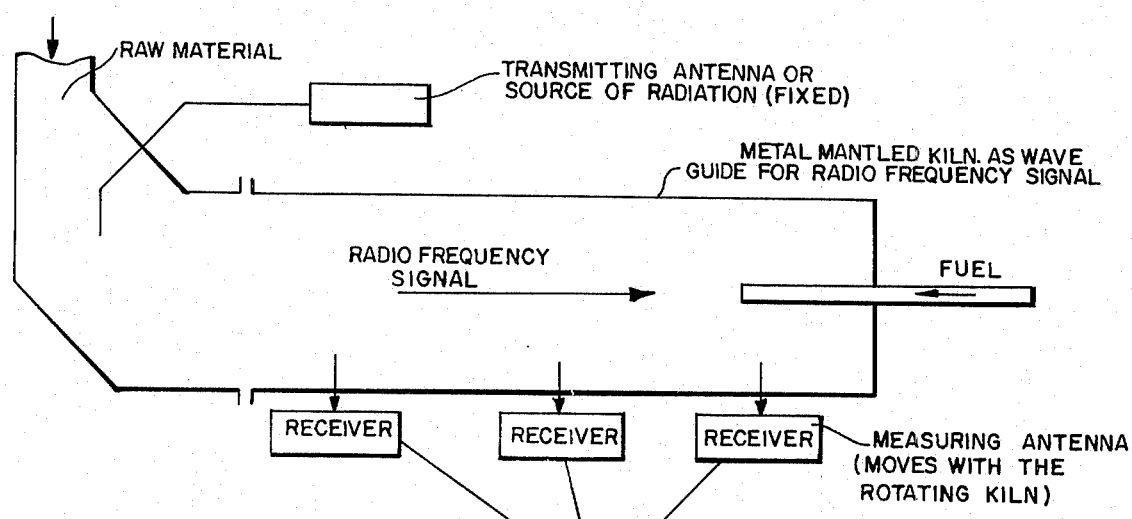
FIG. 6 is a schematic diagram and shows the essential elements of the present invention and their interrelationships.

FIG. 4 illustrates another embodiment of the measuring antenna in the cross-sectional plane of the furnace. The coupling sond 37 and the measuring antenna 38 are similar to those in FIG. 3 except for the fact that the measuring antenna extends perpendicularly against the axis of the furnace and follows accurately the curvature of the furnace shell. From the measuring antenna radio energy is inductively connected to the stationary link 39 from the connecting poles 40 of which it is taken to the electronic equipment. The stationary link runs along the curvature of the kiln shell in such a way that from the measuring antenna as it passes near the stationary link, energy can be connected continuously almost during the entire revolution of the kiln. In order to avoid faults the transmission line constituted by the stationary link terminates at one end with a suitable termination 41.

Figure 5:
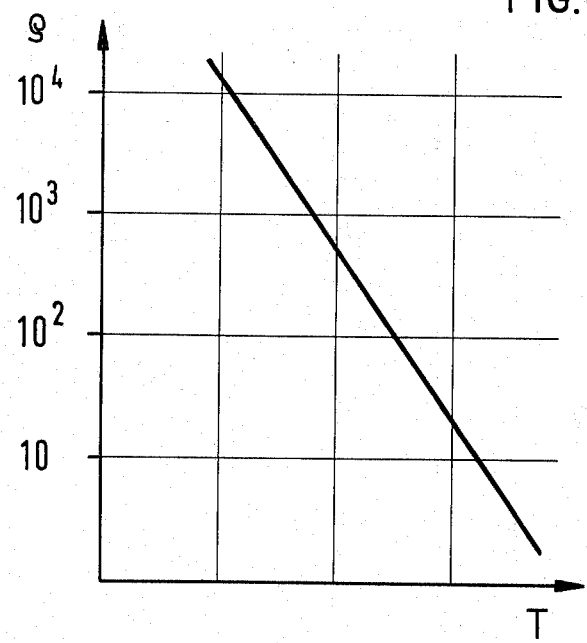
FIG. 5 is a diagrammatic presentation of the dependence between the temperature and the specific resistance of the mass in the kiln. This figure is not, however, intended to facilitate the calibration of the device although the specific resistance is the most important factor as to the degree of attenuation, but it is only intended to illustrate the character of the dependence.

FIG. 5 shows as a diagram only the character of dependence between the temperature in the kiln and the specific resistance of the material contained therein. The horizontal scale indicating temperature can be considered to be linear while the vertical scale for specific resistance is suitably logarithmic. As can be seen, the dependence trend is directed downwards which means that the higher the temperature the more conductive the materials become. This causes, as the temperature rises, greater and greater attenuation of radio frequency energy which attenuation due to its uniformity can be easily converted into measurement result. A lot more complicated temperature dependence could even be converted into a measuring result by using modern computers or data machines.

This invention is not limited to the described embodiments, but it covers all procedures according to the method presented in claim 1. The basic idea of this invention is thus the fact that the steel mantle of the furnace is being used as wave guide thus creating completely new way of measuring temperature or a corresponding quantity from such severe conditions as those prevailing inside a cement kiln or some other such furnace.

We claim:

1. A method for measuring conditions inside a cement kiln or like during its operation, the body of the kiln being comprised of a conductive shell with fire proof lining disposed therein, at one end of the kiln being disposed a transmitting antenna, the protective shell and material inside the kiln being used as a wave guide for radio frequency energy radiating from said antenna, said method including the step of measuring the prevailing field at desired spots along the length of the kiln whereby the impedance of the antenna, attenuation of radiation, the wave length or phase are usable to indicate temperature and other conditions inside the furnace.

2. The method according to claim 1, wherein the transmitting antenna is disposed at the same end of the furnace as the fuel supply system for the cement kiln, the kiln end being normally stationary and the transmitting antenna being arranged in such a manner that it produces such a wave form into the wave guide formed by the kiln that it is measurable.

3. The method according to claim 1, wherein there are measuring antennas disposed at desired spots along the length of the kiln, as a transmitting antenna for feeding the wave form into the wave guide formed by the metal shell of the kiln and by the material contained therein, and using the rest of the measuring antennas as actual receiving antennas.

4. The method according to claim 1 wherein there is only one antenna per measurement position, and measuring the input impedance of the antenna to determine the conditions inside the kiln.

5. The method according to claim 1 wherein the measuring step is performed using at least two radio frequencies or by using periodically changing frequencies which obtain different attenuation, wave length or phase due to the conditions in the kiln, whereby in addition to the temperature, other factors inside the kiln will be detected, said factors having a predetermined effect upon the radiation attenuation or wave length and phase.

6. A device for measuring conditions inside a cement kiln comprising an antenna structure run through one end of the cement kiln, radio frequency energy being supplied to said antenna, said kiln having a kiln shell adapted to form a wave guide, measuring antennas located at desired spots along the length of the kiln, prevailing field strength measured by these antennas being indicative of conditions prevailing inside the kiln, particularly temperature.

7. The device according to claim 6, including means for rotating said kiln a stationary loop antenna inductively coupled to each of the measuring antennas once during each revolution of the kiln, the measured result being transmitted from the measuring antenna to measuring equipment only when the measuring antenna is in a predetermined position relative to the material inside the kiln.

8. The device according to claim 1, including means for rotating said kiln, each of the measuring antennas lie in a plane perpendicular to the kiln axis, a stationary link inductively coupled to each measuring antenna, said stationary link travelling around the kiln in a plane perpendicular to the axis in such a way that the measured result is transmitted from the measuring antenna to measuring equipment during a substantial part of a revolution of the kiln.

9. The device according to claim 1, including means on the kiln and opposite to the antenna and arranged so that it does not cause substantial reflections on the wave propagating in the wave guide formed by the kiln.

10. The device according to claim 1, including means for altering the frequency of radio energy supplied to the furnace and for measuring the field by a periodically changing frequency, whereby in addition to information about temperature, additional information on the contents and conditions of the kiln is obtained.

* * * * *